United States Patent [19]

Uchida et al.

[11] Patent Number: 4,959,451
[45] Date of Patent: Sep. 25, 1990

[54] NOVEL DIALLYL TEREPHTHALATE PREPOLYMER AND METHOD FOR PREPARING IT

[75] Inventors: Hiroshi Uchida; Kuniomi Marumo; Shigehiro Chaen, all of Ohita, Japan

[73] Assignee: Showa Denko Kabushiki Kaisha, Tokyo, Japan

[21] Appl. No.: 422,727

[22] Filed: Oct. 17, 1989

[30] Foreign Application Priority Data

Oct. 18, 1988 [JP] Japan ................................ 63-262217

[51] Int. Cl.$^5$ ............................................. C08G 63/02
[52] U.S. Cl. .................................... 528/272; 528/306; 528/308; 528/308.6
[58] Field of Search ............. 528/272, 306, 308, 308.6

[56] References Cited

U.S. PATENT DOCUMENTS 3,925,327 12/1975 Mitsushima et al. ................. 526/229
4,039,631 8/1977 Robertson et al. .................. 524/152
4,041,009 8/1977 Takeda et al. ........................ 526/322

Primary Examiner—Morton Foelak
Assistant Examiner—S. Acquah
Attorney, Agent, or Firm—Sughrue, Mion, Zinn, Macpeak & Seas

[57] ABSTRACT

A diallyl terephthalate prepolymer is here disclosed which essentially has the following structure $$CH_2=CHCH_2O(COArCOOBO)_nCOArCOOCH_2CH=CH_2$$

wherein B is a divalent organic residue derived from a diol having 2 to 20 carbon atoms, Ar is a 1,4-phenylene group, and n is a value of 1 to 100, and having an unsaturation in a range of 20 to 100, as represented by an iodine value determine by the Wijs method, and there is also disclosed a method for preparing the diallyl terephthalate prepolymer.

The method of the present invention permits obtaining the allyl prepolymer having excellent physical properties from inexpensive raw materials with less labor.

Since this prepolymer has a double bond suitably, it can be mixed with unsaturated polyester resin or diallyl phthalate resin, when used. Moreover, the prepolymer can be also used as a crosslinking agent for EPR, elaslene, synthetic rubber and the like.

8 Claims, 9 Drawing Sheets $^{13}$C NMR SPECTRUM OF PREPOLYMER IN EXAMPLE 1

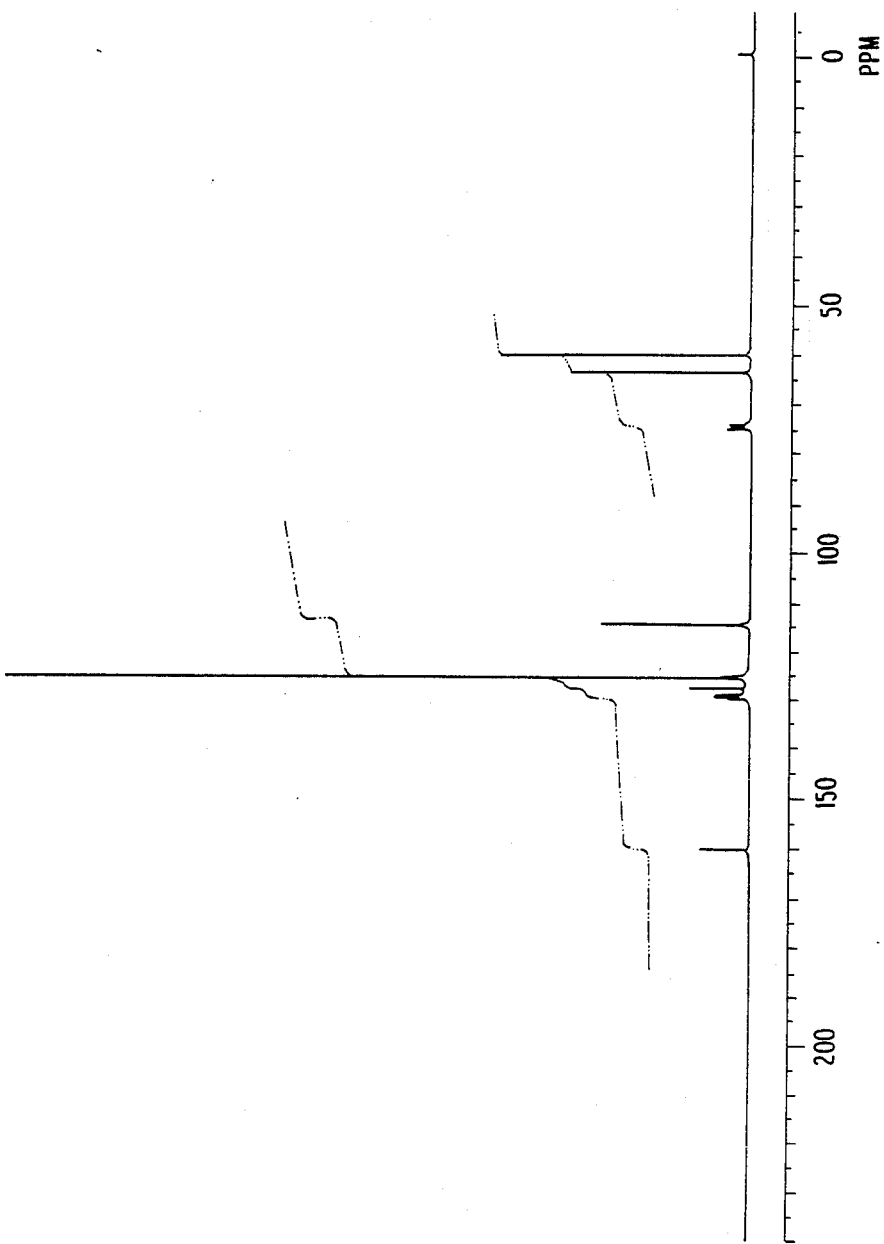
FIG. 1  13C NMR SPECTRUM OF PREPOLYMER IN EXAMPLE 1

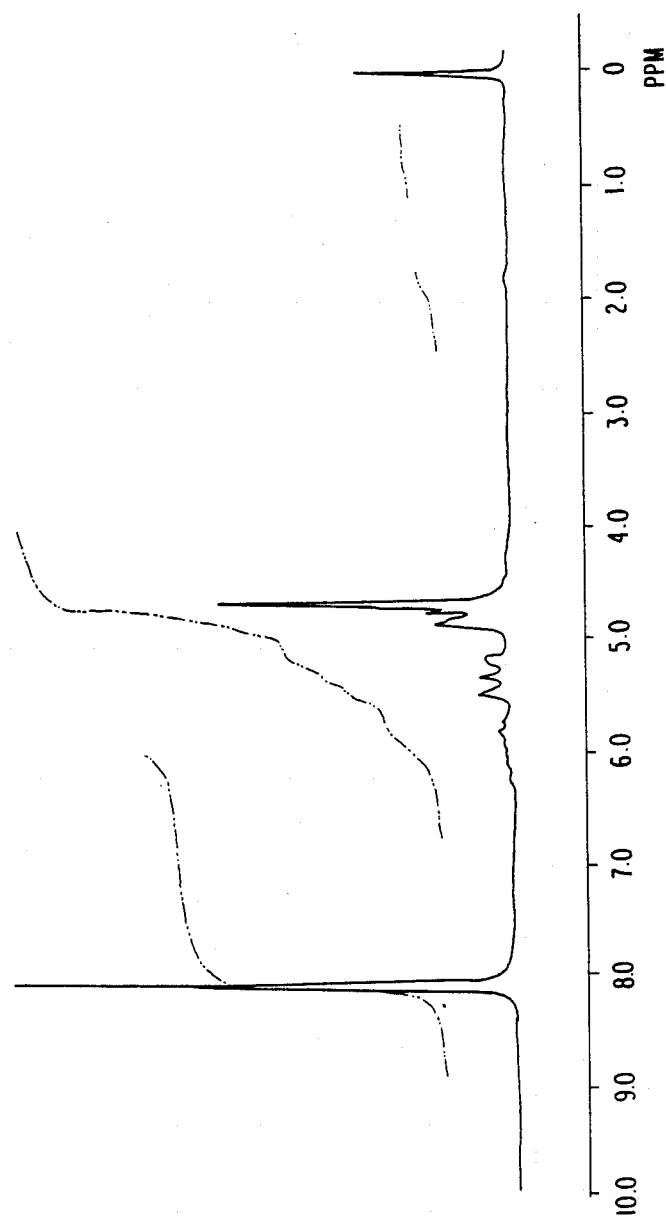
FIG. 2 1H NMR SPECTRUM OF PREPOLYMER IN EXAMPLE 1

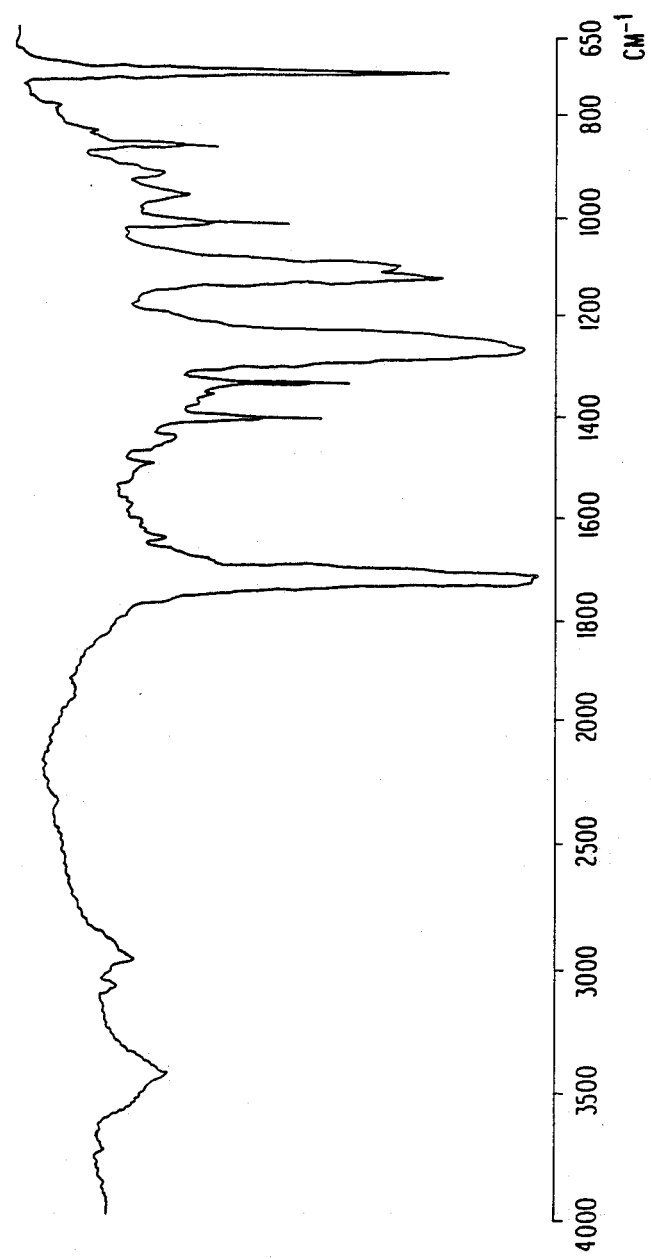
FIG. 3   IR SPECTRUM OF PREPOLYMER IN EXAMPLE 1

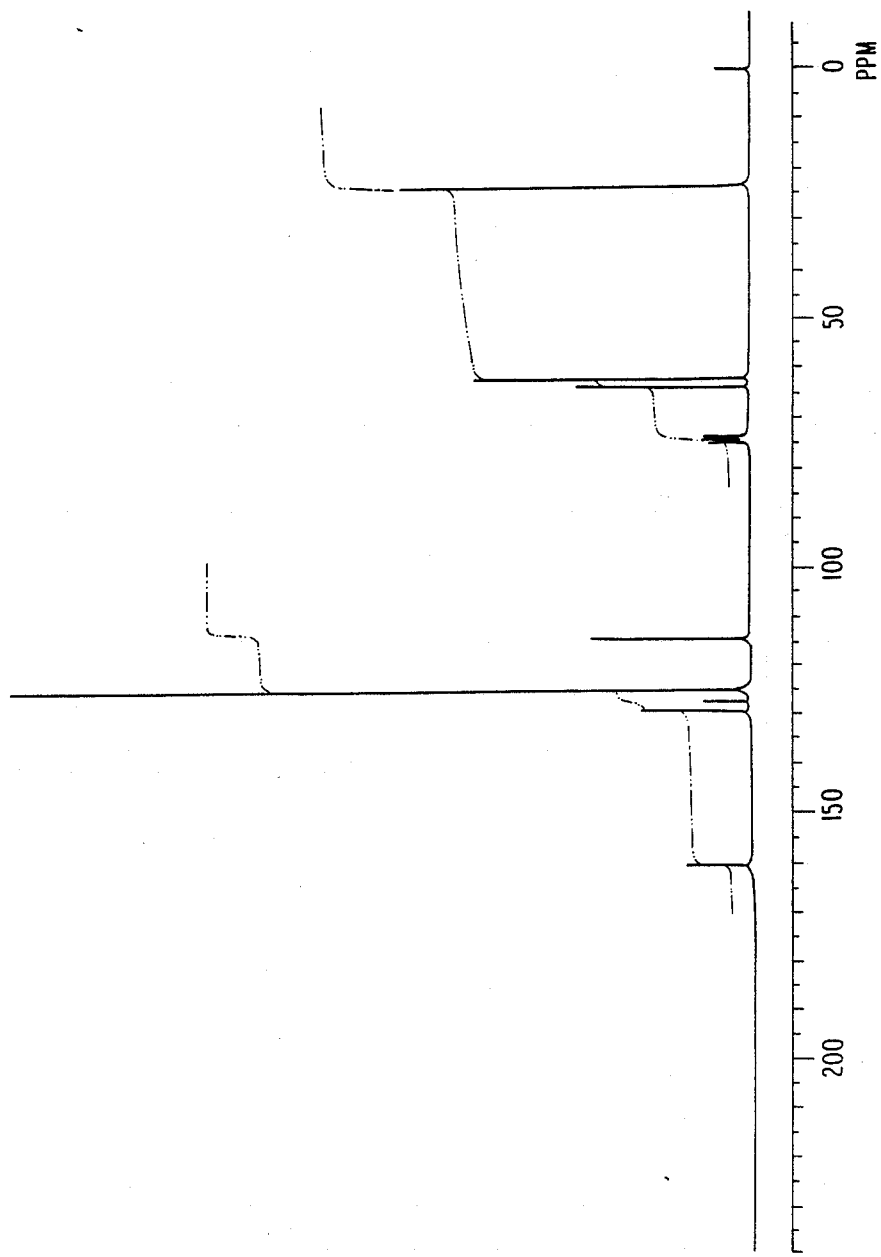
FIG. 4 13C NMR SPECTRUM OF PREPOLYMER IN EXAMPLE 2

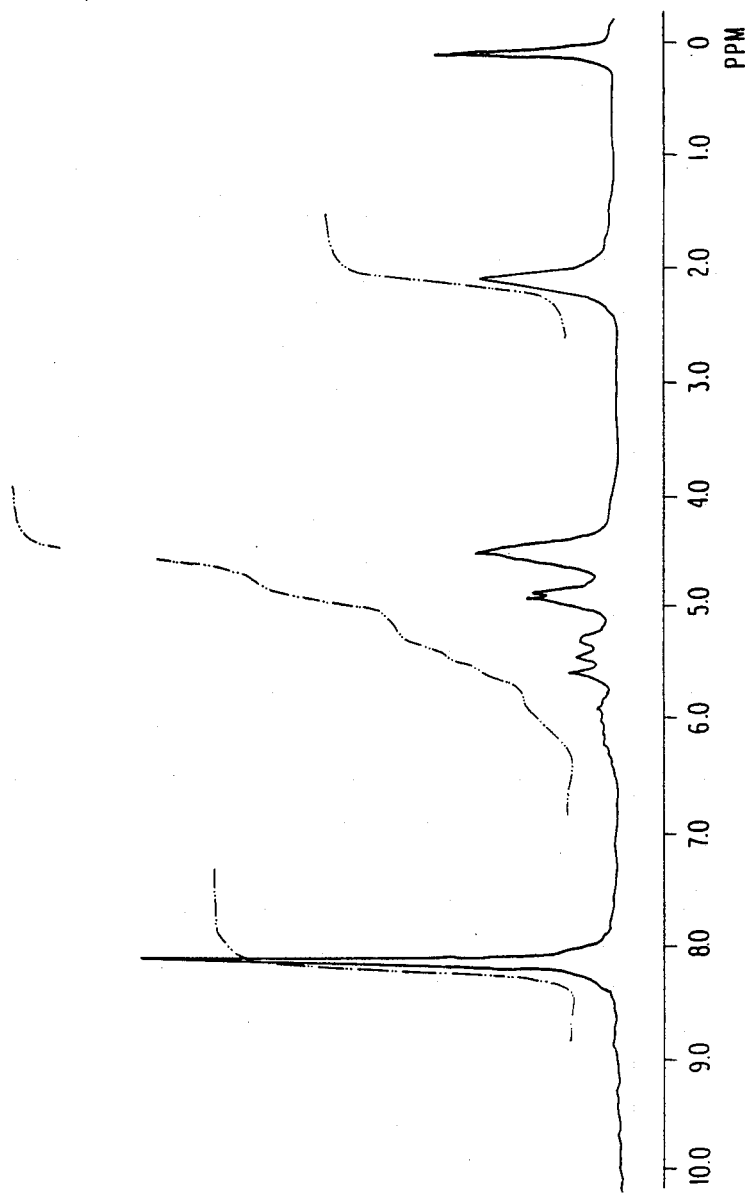
FIG. 5 1H NMR SPECTRUM OF PREPOLYMER IN EXAMPLE 2

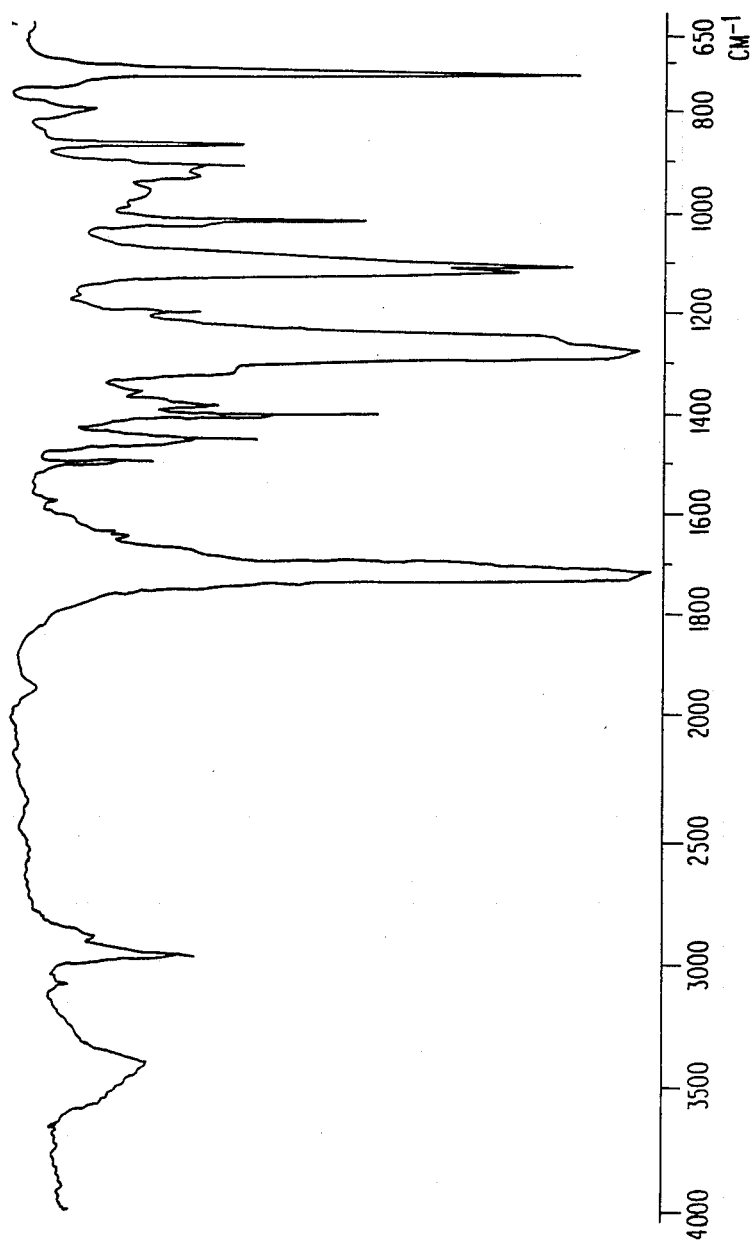

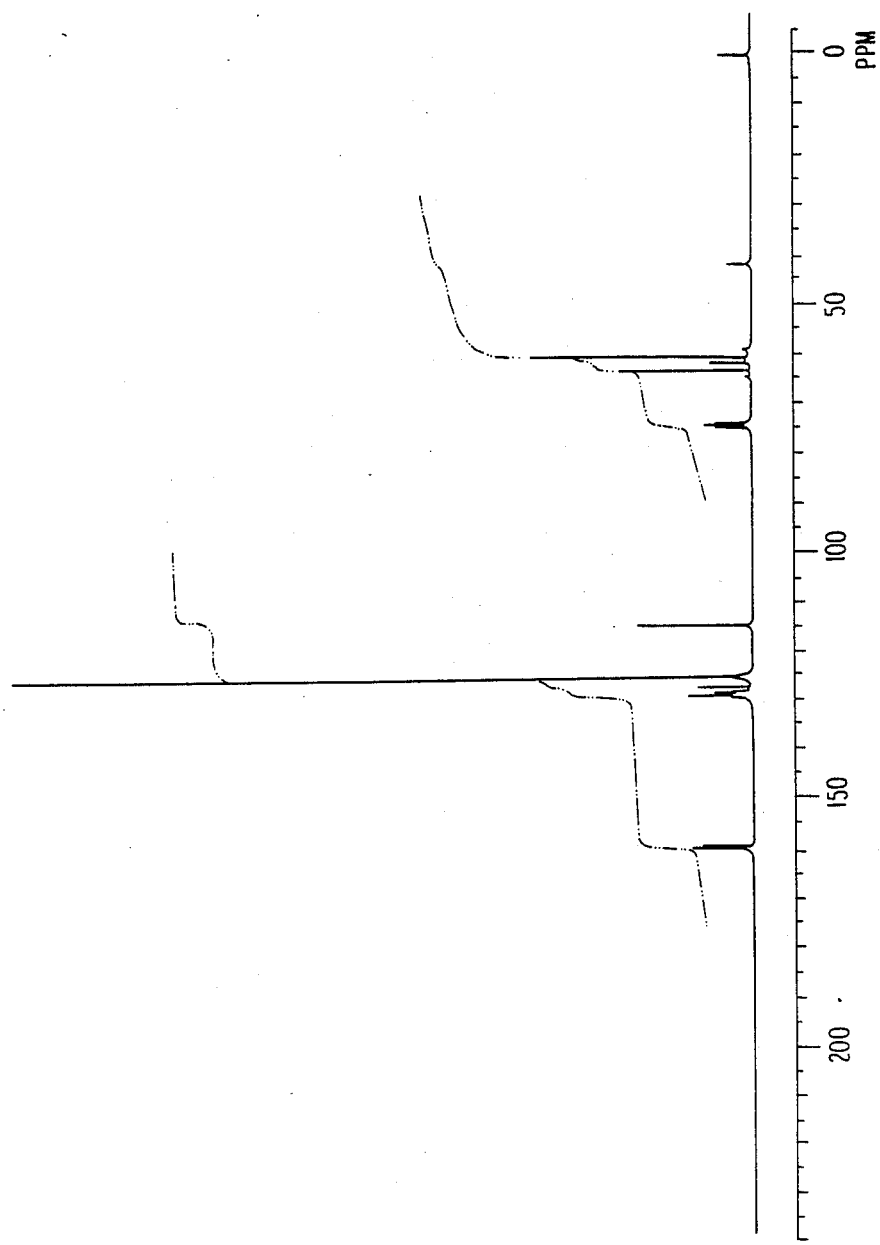
FIG. 7  13C NMR SPECTRUM OF PREPOLYMER IN EXAMPLE 9

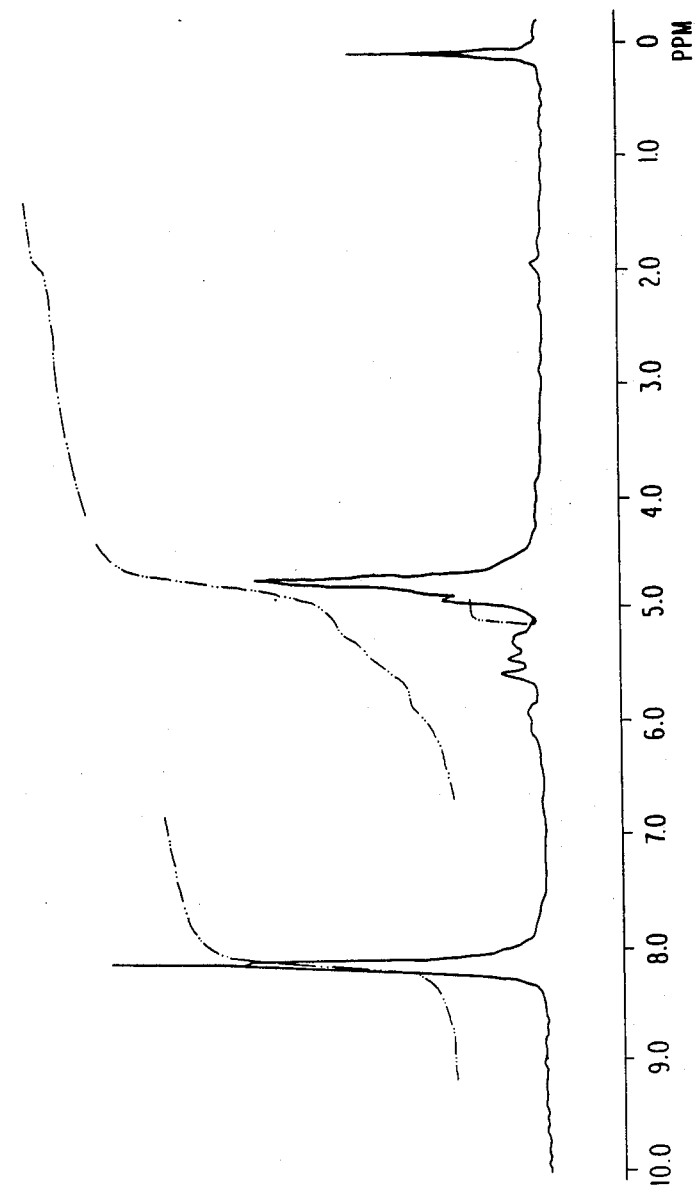
FIG. 8  1H NMR SPECTRUM OF PREPOLYMER IN EXAMPLE 9

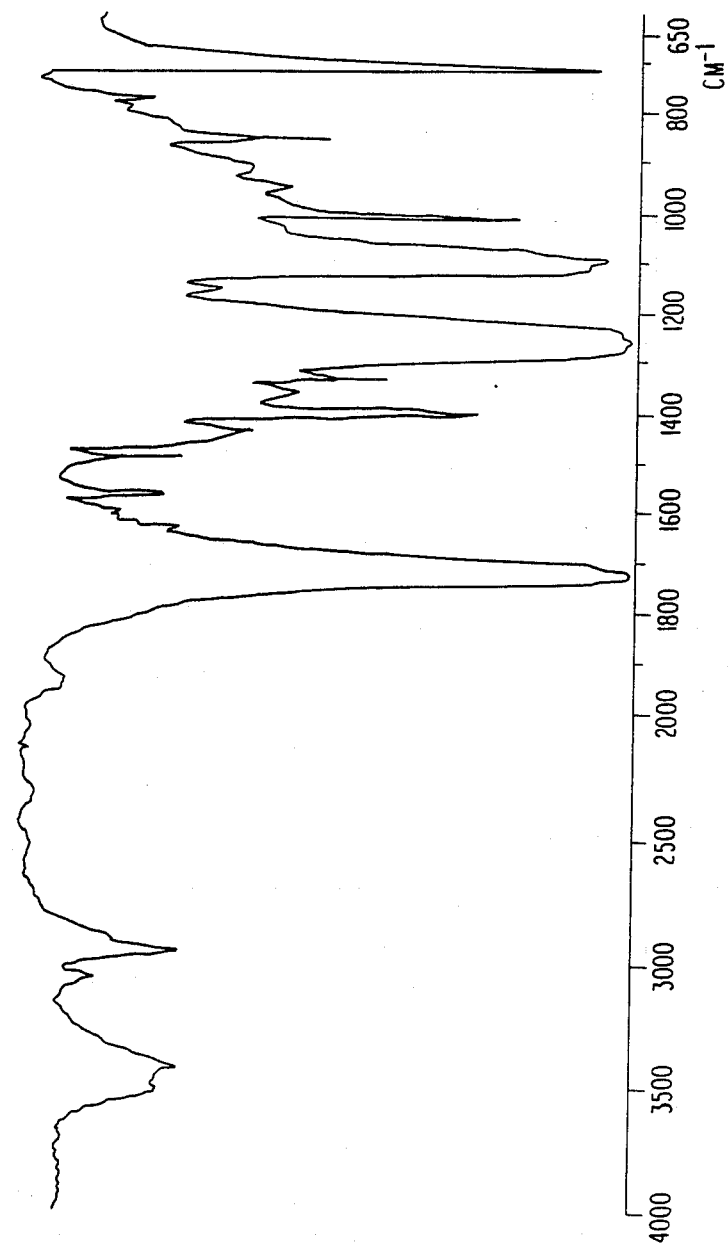
FIG. 9  IR SPECTRUM OF PREPOLYMER IN EXAMPLE 9

NOVEL DIALLYL TEREPHTHALATE PREPOLYMER AND METHOD FOR PREPARING IT

BACKGROUND OF THE INVENTION (1) Field of the Invention

The present invention relates to a novel diallyl terephthalate prepolymer and a method for preparing the same.

(2) Description of the Related Art

Diallyl phthalate resins prepared from diallyl phthalate (hereinafter referred to as "DAP") as a monomer have been widely used in molding materials, decorative plates, laminated plates and the like, and they are considered to be reliable in that their electrical characteristics do not deteriorate for a long period of time even under conditions of high temperature and high humidity.

Nevertheless, as the performance of machines and electrical parts is improved more and more, it is desired to develop resins retaining the present excellent features and additionally having improved heat resistance.

The monomer for the DAP resin has two double bonds, and therefore gelation of the DAP resin occurs inconveniently at the point of a low conversion, when polymerized in a usual manner. Thus, for the purpose of avoiding the gelation, the following procedure is now employed: The polymerization is stopped transiently prior to the gelation so as to take out the resulting polymer as a prepolymer, and a polymerization initiator and a filler are then added to the prepolymer to obtain a product which can be commercially used. Accordingly, an efficient production process for the prepolymer also is an important theme. The known methods for the prepolymer which have been heretofore suggested are not satisfactory yet, and therefore the development of the effective novel method is demanded.

In the case that diallyl terephthalate (hereinafter referred to as "DAT") which is conveniently symmetrical is used as a monomer, the improvement of heat resistance can be expected. However, it is known that three-dimensional network-cured resins of DAT are still poor in mechanical properties, and for example, they are brittle. For this reason, they have not been put into practice yet.

Heretofore, bulk polymerization and other polymerization methods using various solvents are known as techniques of preparing the prepolymer. However, with regard to the bulk polymerization not using any solvent, the iodine value of the prepolymer does not lower less than about 80, even when the polymerization is stopped just before the gelation, and in this case, the weight average molecular weight (hereinafter referred to as "Mw") of the prepolymer which is measured by a GPC method is extremely high. According to researches of the inventors of the present application, it has been found that when the three-dimensional network-cured resin is prepared by using the prepolymer having the excessively high iodine value and the high Mw, drawbacks such as rigid and brittle properties cannot be eliminated and at the time of molding, the viscosity of the material increases merely, and after all, physical properties of the cured resin are not improved at all.

A polymerization method using a solvent such as benzene or ethyl acetate is also known, but in this case, the iodine value lowers, but a molecular chain portion by a carbon-carbon bond of an allyl group in the monomer unit is still long, which means that the physical properties are not improved yet.

In Japanese Laid-open Patent Application No. 80409/1984, a synthetic method of the prepolymer is disclosed which comprises copolymerizing DAT and an aromatic hydrocarbon having at least one hydrogen atom at the benzyl position of toluene, xylene or the like to obtain a cured resin with excellent heat resistance and high mechanical strength. However, in order to obtain such a copolymer, it is required to spray the monomer, a polymerization initiator and the aromatic hydrocarbon through a special nozzle with stirring at a high speed, and therefore the polymerization and reaction devices must be contrived. In addition, this disclosed method requires a great deal of the initiator, and what is worse, it is not easy to reuse the monomer because of radical copolymerization.

Another polymerization can be conceived which uses a halogenated hydrocarbon or an aldehyde derivative having a relatively high chain transfer constant, but also in this case, a radical generated from a solvent is added to an allyl group, so that the so-called telomerization takes place and performance of the resulting polymer deteriorates.

A diallyl isophthalate resin is also industrially manufactured as a resin having high heat resistance, but the price of its monomer is too high to be practicable.

A method of using a specific monomer such as diallyl naphthalenedicarboxylate is suggested, but in this case, the monomer is so expensive that the method is not put into practice.

However, any methods mentioned above cannot improve the productivity of the prepolymer to a satisfactory extent.

As already known, it has been also tried to copolymerize the DAP monomer and another monomer, so that a copolymer with ethylene which is excellent in physical properties is obtained. However, also in the case, the gelation occurs during copolymerizing, because the DAP monomer has two double bonds. Therefore, the polymerization must be stopped prior to the gelation. Apparently, this method impairs productivity because of the problem of monomer circulation, though the physical properties are improved.

An unsaturated polyester mainly containing terephthalic acid is also known, but in this case, it is necessary to add maleic anhydride or fumaric acid as an unsaturated component. Therefore, the portion of the unsaturated component is poor in heat resistance, and a glass transition point (Tg) is not so high, either.

Japanese Patent Publication No. 13808/1970 discloses that a mixture of a diallyl ester of a dibasic acid, a trivalent or more-valent polyol and glycol is subjected to an ester exchange reaction in order to obtain a crosslinkable polyester of the polyol. However, according to the present inventors' pursuance, the polyester of the polyol which was based on phthalic acid or isophthalic acid had insufficient heat resistance, and the ester resin decomposed at a high temperature of 200° C. or more.

In Japanese Laid-open Patent Application No. 142027/1976, an oligoester of a hydroxyl group at a molecular terminal is disclosed, but according to the present inventors' pursuance, the ester was in a liquid and viscous state, and handling also was difficult. In addition, the ester resin did not have sufficient heat

SUMMARY OF THE INVENTION

It is attributable to the structure of DAT itself that physical properties such as mechanical strength are poor. For the purpose of solving this problem, the present inventors have conceived the utilization of an improver in a manner which is different from conventional cases.

Although most of conventional copolymerizations are radical copolymerizations, but the present invention comprises a different process. That is, the present invention comprises reacting a polyol having two or more hydroxyl groups with DAT, removing allyl alcohol from the reaction system, in order to obtain a prepolymer.

Surprisingly, the above-mentioned fact can be achieved only when a dicarboxylic acid has the structure of terephthalic acid. In the case that diallyl phthalate or diallyl isophthalate having a similar structure is used, a viscous prepolymer is prepared instead of a powdery prepolymer, probably because the crystallinity of the prepolymer would be low. Additionally, in the prepolymer obtained in such a case, heat resistance is extremely poor and mechanical strength is also low.

The present invention is directed to a prepolymer essentially having the following structure

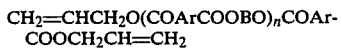

wherein B is a divalent organic residue derived from a diol having 2 to 20 carbon atoms, Ar is a 1,4-phenylene group, and n is a value of 1 to 100, and having an unsaturation in a range of 20 to 100, as represented by an iodine value determined by the Wijs method; or a diallyl terephthalate prepolymer characterized by having an allyl ester group ($CH_2$=$CHCH_2OCO$—) at its terminal and repeating units

   moiety A

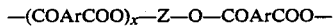   moiety B wherein x is an integer of 2 to 10, Z is an organic residue derived from a polyol having 3 to 10 hydroxyl groups, B is a divalent organic residue derived from a diol having 2 to 20 carbon atoms, and Ar is a 1,4-phenylene group, and having an unsaturation in a range of 20 to 100 in terms of an iodine value measured by the Wijs method, a mol fraction of the moiety A in the prepolymer portion exclusive of the terminal allyl groups being in the range of 10 to 98%, a mol fraction of the moiety B being in the range of the remaining ratio.

BRIEF DESCRIPTION OF THE DRAWINGS

FIGS. 1 to 9 are explanatory views illustrating structures of polymers of the present invention.

DESCRIPTION OF THE PREFERRED EMBODIMENTS

Examples of a polyol having two or more hydroxy groups used in the present invention include divalent alcohols containing aliphatic or aromatic rings such as ethylene glycol, 1,2-propylene glycol, 1,4 butanediol, 1,6-hexanediol, 1,4-cyclohexane dimethanol, 1,3-butanediol, 1,3-cyclohexanediol, p-xylene glycol and styrene glycol; trivalent aliphatic alcohols such as glycerin and trimethylolpropane; and tetravalent or more-valent alcohols such as pentaerythritol and sorbitol. They can be used singly or in combination.

The amount of the polyol having two or more hydroxyl groups with respect to DAT is such that the iodine value of the product is in the above-mentioned range thereof. When the iodine value is too low, a three-dimensional network-curing reaction cannot be performed effectively, and when it is too high, strain is introduced into the product in the three-dimensional network-curing step, so that physical properties deteriorate.

In the case of the diol, when the latter is used together with DAT in equimolar amounts, a linear polyester is formed inconveniently and its iodine value is not present in the above-mentioned range. Furthermore, in the case that the trivalent or more-valent polyol is used, gelation occurs at times, depending upon its amount. Therefore, the amount of the diol or the polyol should be suitably limited.

With regard to the gelation, the Flory's gelation reaction theory based on statistical treatments is known, and theoretical formulae of this theory should be utilized to foresee the gelation and the raw materials should be used in such a ratio as not to bring about the gelation.

Typically, a divalent aliphatic alcohol such as ethylene glycol, 1,2-propylene glycol, 1,4-butanediol, 1,6-hexanediol, 1,4-cyclohexane dimethanol or 1,3-butanediol is used in an amount of 0.98 mol or less, preferably 0.8 mol or less with respect to 1 mol of DAT. A trivalent aliphatic alcohol such as glycerin or trimethylolpropane is used in an amount of 0.5 mol or less, preferably 0.33 mol or less with respect to 1 mol of DAT, and a tetravalent aliphatic alcohol such as pentaerythritol is used in an amount of 0.33 mol or less, preferably 0.25 mol or less with respect to 1 mol of DAT. Also in the case that two or more kinds of polyols are used, it is preferred that the above-mentioned amounts are applied.

Sometimes, a gel is slightly contained in the reaction system, depending upon reaction conditions, but there is no problem in such case, so long as the reaction mixture does not become a gelatin state all over.

The molecular weight of the prepolymer can be adjusted by changing the ratio between the amounts of the raw materials. If a low molecular weight is desired, DAT should be used in large excess, but in such a case, the remaining monomer increases, which is unpreferable to isolate the prepolymer. Furthermore, when the molecular weight is increased excessively, the viscosity of the prepolymer rises, which is not convenient from viewpoints of molding and the like. With regard to the preferable range of the molecular weight of the prepolymer, a number average molecular weight (Mn) measured by GPC (gel permeation chromatography) is in the range of 300 to 30,000 as polystyrene, preferably 500 to 15,000 as polystyrene, and a weight average molecular weight (Mw) is in the range of 600 to 1,000,000 as polystyrene, preferably 1,000 to 70,000 as polystyrene, and an Mw/Mn ratio is in the range of 1.2 to 20.0.

With regard to a reaction system for the preparation of the prepolymer, a polyol, DAT and an ester exchange solvent are usually put into a reactor, and reaction is then carried out, while allyl alcohol is distilled off.

According to an industrially more effective method, dimethyl terephthalate or diethyl terephthalate and allyl alcohol which take the place of DAT, a polyol and an ester exchange catalyst is put into a reactor, and reaction is then carried out therein, while methanol or ethanol is distilled off, in order to prepare the prepolymer.

As the ester exchange catalyst used in the present invention, an already known ester exchange catalyst can be used, and examples of the particularly preferable catalyst include alkali metals, alkaline earth metals, oxides thereof, salts of weak acids, oxides of Mn, U, Zn, Cd, Zr, Pb, Ti, Co and Sn, hydroxides, salts of inorganic acids, alcoholates, salts of organic acids, and organic tin compounds such as dibutyltin oxide, dioctyltin oxide and dibutyltin dichloride.

The amount of the ester exchange catalyst depends upon its activity, but it should be used in such an amount as to distill off allyl alcohol at a suitable rate. Usually, the ester exchange is used in an amount of 0.0001 to 1% by weight, preferably 0.001 to 0.1% by weight based on the weight of DAT.

In an embodiment of the reaction, when DAT is used, a reaction solution is heated up to a boiling point or more of allyl alcohol, or alternatively when dimethyl terephthalate or diethyl terephthalate is used, the reaction solution is heated up to a boiling point or more of methanol or ethanol in order to perform ester exchange, and the resulting allyl alcohol, methanol or ethanol is removed from the reaction system by the distillation so as to be advantageous for the production of the prepolymer. In general, the reaction is performed under atmospheric pressure or under increased pressure, but it is also effective that the pressure in the reaction system is reduced along with the improvement of conversion so as to accelerate the removal of allyl alcohol, methanol or ethanol by the distillation.

When DAT is used and when the reaction temperature is less than the boiling point of allyl alcohol, the latter cannot be distilled off efficiently, and when the reaction temperature is too high, the problem of thermal polymerization takes place. In consequence, the reaction temperature is generally selected from the range of 100° to 300° C., preferably 130° to 250° C.

In the case that dimethyl terephthalate or diethyl terephthalate is used, much attention should be paid. That is, the boiling point of the resulting methanol or ethanol is close to that of allyl alcohol which takes part in the reaction, and therefore, if the reaction is carried out at an excessively high temperature from the beginning, allyl alcohol tends to be distilled off together with methanol or ethanol. In order to get rid of this inconvenience, an efficient rectifying-column should be equipped, and the reaction temperature should be selected from the range of 80 to 200° C., preferably 90° to 180° C. at an early stage of the reaction, and from the range of 100° to 300° C., preferably 130 to 250° C. after most of methanol or ethanol has been distilled off. The amount of allyl alcohol is at least 0.2 mol, usually 0.5 mol or more, preferably 1 mol or more with respect to 1 mol of dimethyl terephthalate or diethyl terephthalate. However, when the amount of allyl alcohol is too excessive, it is necessary to remove extra allyl alcohol, and the reaction rate cannot be always accelerated. Therefore, the amount of allyl alcohol should be limited to 4 mol or less.

In addition, a polymerization inhibitor such as hydroquinone may be added to the reaction mixture, depending upon a reaction temperature.

In addition to DAT, a lower ester of a polybasic acid may be added to the reaction system in such an amount as not to adversely affect the reaction system, for the sake of the dealcoholization reaction.

After the reaction, the prepolymer can be taken out from the reaction system by various procedures. For example, unreacted DAT may be distilled off under reduced pressure, and the reaction mixture may be then cooled to solidify itself, followed by grinding. In this case, it is necessary that the pressure is reduced to a level enough to distill off DAT, and the temperature must be also limited, because the operation at an excessively high temperature would lead to the thermal polymerization of the produced prepolymer. Therefore, the removal of DAT should be carried out at a pressure of at least 10 mmHg or less, preferably 5 mmHg or less at a temperature of 300° C. or less, preferably 250° C. or less. Under such conditions, DAT can be successfully distilled off, and the DAT-free reaction mixture can be also easily changed into powder by cooling and solidifying the mixture and then by using a grinder. Examples of the usable grinder include a jaw crusher, a gyratory crusher, a rotary crusher, an attrition mill, an edge runner, a ring roll mill, a ball mill, a tower type attrition mill, a hammer crusher, a micron mill and a microanalizer.

Alternatively, after the reaction, the prepolymer may be taken out by directly pouring the reaction mixture into a bad solvent and then collecting the resulting precipitate. The usable bad solvent is a solvent which dissolves DAT and the polyol of the raw materials but which does not dissolve the produced prepolymer, and such a solvent is preferably an aliphatic saturated alcohol. Taking a post-treatment such as drying into consideration, the aliphatic saturated alcohol having a boiling point of 200° C. or less, preferably 150° C. or less is preferable. Examples of such an alcohol include methanol, ethanol, isopropyl alcohol, n-propyl alcohol, n-butyl alcohol, isobutyl alcohol, sec-butyl alcohol and tert-butanol, and methanol is particularly desirable.

When the bad solvent is used in an excessively small amount, the unreacted raw materials cannot be recovered effectively, and what is worse, the prepolymer coheres in a dumpling state, so that the powdery product cannot be obtained. In addition, the use of a large excess of the bad solvent is not economical. The amount of the bad solvent is usually from 1.5 to 20 times by weight, preferably 2 to 10 times by weight as much as that of the reaction mixture. When the reaction mixture is poured into the bad solvent, the temperature of the reaction mixture is required to be at least a temperature at which the mixture is flowable. The excessively high temperature of the reaction mixture is liable to lead to the thermal polymerization of the prepolymer. Thus, the temperature of the reaction mixture is selected from the range of 80° to 300° C., preferably 100° to 250° C. With regard to the temperature of the bad solvent, when this temperature is too high, the powdery prepolymer cannot be obtained. Inversely, when it is too low, cooling cost increases uneconomically. Thus, the temperature of the bad solvent is in the range of 0° to 100° C., preferably 10° to 80° C.

A certain kind of prepolymer is liquid at ordinary temperature, and such a prepolymer can be purified by vacuum distillation or extraction.

The structure of the prepolymer regarding the present invention is confirmed by the following experiments.

(A) Measurement of Iodine Value

In a 200-ml iodine flask was placed 0.25 to 0.35 g of a prepolymer, and 30 ml of chloroform was further added thereto and the sample is then dissolved completely. Afterward, 20 ml of a Wijs reagent (which is prepared by dissolving 7.9 g of iodine trichloride and 8.2 g of iodine separately in 200 to 300 ml of glacial acetic acid, then mixing both the liquids, and further adding glacial acetic acid to the solution so as to bring the volume of the mixture into 1 liter) is precisely added thereto by the use of a whole pipette, and 10 ml of a 2.5% mercuric acetate solution in glacial acetic acid is further added thereto. The solution is then allowed to stand in a dark place, whereby the reaction is brought to an end.

Afterward, 50 ml of a newly prepared 20% KI solution is added thereto, and a 1% starch solution is used as an indicator. Titration is then carried out by using a 0.1 N $Na_2S_2O_3$ standard solution. Simultaneously, a blank test is also made.

$$\text{Iodine Value} = [(A-B) \times f \times 1.27]/S$$

A: The volume (ml) of the 0.1 N $Na_2S_2O_3$ standard solution required in the blank test
B: The volume (ml) of the 0.1 N $Na_2S_2O_3$ standard solution required in the main test
f: Factor of the 0.1 N $Na_2S_2O_3$ standard solution
S: The weight (g) of the sample

(B) Measurement of Mn and Mw by GPC method

Mn and Mw, as polystyrene, of the prepolymer are measured by GPC.

SHODEX column AC-80P, 802, 804 and 806 are connected one by one in series in this order, and chloroform is used as a solvent. Measurement is then made at a column temperature of 30° C. at a flow rate of 1.0 ml/minute.

(1) In the first place, at least 10 kinds of commercial standard polystyrenes are used in which the average molecular weights are known, and retention times of the respective polystyrenes and a DAT monomer are measured. The relation between the average molecular weights and the retention times is indicated by a third-order curve or a polygonal line, and on the basis of this curve or line, a calibration curve is then prepared.

(2) In 20 ml of chloroform is dissolved 20 mg of a prepolymer sample, and 0.1 ml of the sample solution is then injected into a column through a line filter by the use of a loop injector in order to obtain elution curve data. On the basis of these data and the calibration curve prepared in the previous paragraph (1), calculation is automatically made by means of a data processor such as the model CR-3A manufactured by Shimadzu Seisakusho Ltd., whereby Mn and Mw of the prepolymer are obtained. In this machine, peaks are divided every 10 seconds, and when the molecular weight of each divided section is represented by Mi and the height of each peak is represented by Hi, Mn and Mw of the prepolymer are calculated through the following formulae:

$$Mn = \Sigma Hi / \Sigma (Hi/Mi)$$

$$Mw = \Sigma MiHi / \Sigma Hi$$

(C) Measurement of $^{13}C$ NMR and $^1H$ NMR

Apparatus which are used herein:
$^{13}C$ NMR: Blucker CXP-300
$^1H$ NMR: Hitachi R-24B As a solvent for measurement, chloroform to which heavy hydrogen is bonded is used, and as an internal standard material, tetramethylsilane is used.

The prepolymer of the present invention has a flexible alkyl group in a polyol portion and has a desirably symmetrical terephthalic acid skeleton, and therefore in the prepolymer, bending strength and impact resistance are excellent and heat resistance is also maintained at a high level. Furthermore, an allyl group is properly attached to each molecular terminal, so that surface hardness also lies at a high level.

This novel prepolymer of the present invention, when desired, may be mixed with a filler, a polymerization promotor, a polymerization inhibitor, an internal release agent, a coupling agent, a pigment and other additives in such an amount as not to impair physical properties of the prepolymer, whereby moldability or physical properties of molded articles can be improved.

In addition, since the prepolymer of the present invention has a double bond suitably, it can be mixed with unsaturated polyester resin or diallyl phthalate resin, when used. Moreover, the prepolymer can be also used as a crosslinking agent for EPR, elaslene, synthetic rubber and the like.

The following examples will be helpful in attaining an understanding of the invention. However, the examples are intended to be illustrative and should not be construed so as to limit the invention unduly.

EXAMPLE 1

In a 1-liter three-necked flask equipped with a distillation device were placed 600 g of DAT, 78.4 g of ethylene glycol and 0.1 g of dibutyltin oxide, and they were heated up to 180° C. under a nitrogen gas atmosphere and the resulting allyl alcohol was distilled off. When the amount of distilled allyl alcohol had reached 140 g, the pressure in the reaction system was reduced to 50 mmHg so as to accelerate the distillation rate of allyl alcohol. After the theoretical amount of allyl alcohol had been distilled off, reaction was further performed for 1 hour, and the resulting reaction product was then cooled. After the reaction product had been solidified, the solid of a prepolymer was ground into small masses. The latter were then put into 1 liter of methanol, and the mixture was stirred vigorously for about 1.0 hour in order to bring the prepolymer into a powdery state. The used methanol was separated from the prepolymer by filtration, and afterward drying and grinding were carried out in order to prepare 496 g of the prepolymer.

Physical properties of this prepolymer were measured. The results are set forth in Table 1 together with physical properties of prepolymers prepared under different reaction conditions and isolation condition.

Furthermore, $^{13}C$ NMR spectrum, $^1H$ NMR spectrum and IR spectrum of the prepolymer prepared in Example 1 are shown in FIG. 1, FIG. 2 and FIG. 3, respectively.

In FIG. 1, a peak at 61 ppm is attributed to carbon of the methylene group combining with an oxygen atom derived from ethylene glycol; a peak at 64.5 ppm is attributed to carbon of a methylene group at the allyl position derived from allyl alcohol; a peak at 115 ppm is attributed to terminal carbon of the double bond derived from allyl alcohol; a peak at 125.5 ppm is attributed to carbon of the unsubstituted benzene ring derived from terephthalic acid; a peak at 128 ppm is attributed to the inside carbon of the double bond derived from allyl alcohol; a peak in the vicinity of 130 ppm is attributed to carbon of the benzene ring having a carboxyl group derived from terephthalic acid; and a peak at 160 ppm is attributed to carbon of a carbonyl group in the carboxyl group.

In FIG. 2, peaks in the vicinity of 4.6–4.95 ppm are attributed to methylene derived from ethylene glycol and a proton of methylene at the allyl position derived from allyl alcohol; a peak in the vicinity of 5.15–5.6 ppm is attributed to a terminal proton of the double bond derived from allyl alcohol; a peak at 5.7–6.35 ppm is attributed to the inside proton of the double bond derived from allyl alcohol; and a peak in the vicinity of 8.1 ppm is attributed to a proton of the benzene ring derived from terephthalic acid.

In FIG. 3, a peak in the vicinity of 1,720 cm$^{-1}$ is attributed to the absorption of stretching vibration of carbonyl in the carboxyl group.

It was confirmed from the spectrum data that the structure of the prepolymer in Example 1 was $$CH_2=CHCH_2O(COArCOOCH_2CH_2O)_nCOArCOOCH_2CH=CH_2$$

wherein Ar is a 1,4-phenylene group.

EXAMPLES 2 to 12

The same procedure as in Example 1 was repeated with the exception that conditions exhibited in Table 1 were employed. The $^{13}$C NMR spectrum of a prepolymer in Example 2 is shown in FIG. 4; the $^1$H NMR spectrum thereof in FIG. 5; the IR spectrum thereof in FIG. 6; the $^{13}$C NMR spectrum of a prepolymer in Example 9 in FIG. 7; the $^1$H NMR spectrum thereof in FIG. 8; and the IR spectrum thereof in FIG. 9.

In FIG. 4, a peak at 25 ppm is attributed to carbon of the methylene group not combining with oxygen derived from 1,4-butanediol; a peak at 63 ppm is attributed to carbon of the methylene group combining with oxygen derived from 1,4-butanediol; a peak at 64.5 ppm is attributed to carbon of a methylene group at the allyl position derived from allyl alcohol; a peak at 115 ppm is attributed to a terminal carbon of the double bond derived from allyl alcohol; a peak at 125.5 ppm is attributed to carbon of the unsubstituted benzene ring derived from terephthalic acid; a peak at 128 ppm is attributed to the inside carbon of the double bond derived from allyl alcohol; a peak at 130 ppm is attributed to carbon of the benzene ring having a carboxyl group derived from terephthalic acid; and a peak at 160 ppm is attributed to carbon on carbonyl in the carboxyl group.

In FIG. 5, a peak in the vicinity of 1.7–2.35 ppm is attributed to a proton of the methylene group not combining with oxygen derived from 1,4-butanediol; a peak in the vicinity of 4.1–4.6 ppm is attributed to a proton of the methylene group combining with oxygen derived from 1,4-butanediol; a peak in the vicinity of 4.6–5.0 ppm is attributed to a proton of methylene at the allyl position derived from allyl alcohol; a peak in the vicinity of 5.1–5.6 ppm is attributed to a terminal proton of the double bond derived from allyl alcohol; a peak at 5.7–6.35 ppm is attributed to the inside proton of the double bond derived from allyl alcohol; and a peak in the vicinity of 8.05 ppm is attributed to a proton of the benzene ring derived from terephthalic acid.

In FIG. 6, a peak in the vicinity of 1,720 cm$^{-1}$ is attributed to the absorption of stretching vibration of carbonyl in the carboxyl group.

It was confirmed from the spectrum data that the structure of the prepolymer in Example 2 was $$CH_2=CHCH_2O(COArCOOCH_2CH_2CH_2CH_2O)_n COArCOOCH_2CH=CH_2$$

wherein Ar is a 1,4-phenylene group.

In FIG. 7, a peak at 41 ppm is attributed to the quaternary carbon combining with oxygen derived from pentaerythritol; a peak at 61 ppm is attributed to carbon of the methylene group combining with an oxygen atom derived from ethylene glycol; a peak in the vicinity of 61.5 ppm is attributed to carbon of the methylene group combining with oxygen derived from pentaerythritol; a peak in the vicinity of 64.5 ppm is attributed to carbon of the methylene group at the allyl position derived from allyl alcohol; a peak at 115 ppm is attributed to an terminal carbon of the double bond derived from ally alcohol; a peak at 125.5 ppm is attributed to carbon of the unsubstituted benzene ring derived from terephthalic acid; a peak at 128 ppm is attributed to the inside carbon of the double bond derived from allyl alcohol; a peak in the vicinity of 130 ppm is attributed to carbon of the benzene ring having a carboxyl group derived from terephthalic acid; and a peak in the vicinity of 160 ppm is attributed to carbon of carbonyl in the carboxyl group.

In FIG. 8, peaks in the vicinity of 4.3–5.0 ppm are attributed to a proton of the methylene group having oxygen derived from pentaerythritol and a proton of a methylene group at the allyl position derived from allyl alcohol; a peak in the vicinity of 5.1–5.6 ppm is attributed to a terminal proton of the double bond derived from allyl alcohol; a peak at 5.7–6.35 ppm is attributed to the inside proton of the double bond derived from allyl alcohol; and a peak in the vicinity of 8.1 ppm is attributed to a proton of the benzene ring derived from terephthalic acid.

In FIG. 9, a peak in the vicinity of 1,720 cm$^{-1}$ is attributed to the absorption of stretching vibration of carbonyl in a carboxyl group.

It was confirmed from the spectrum data that the structure of the prepolymer in Example 9 had allyl ester groups a the terminals thereof and comprised the following two moieties,

| | |
|---|---|
| —(COArCOOCH$_2$—CH$_2$O) | moiety A |
| (COArCOOCH$_2$)$_3$CCH$_2$—O—COArCOO— | moiety B | wherein Ar is a 1,4-phenylene group, and it was identified from the $^{13}$C NMR spectrum in FIG. 7 that a molar ratio of moiety A and moiety B was 1:6.

EXAMPLE 13

In a 1-liter glass autoclave equipped with a rectifying-column were placed 473.1 g of dimethyl terephthalate, 78.4 g of ethylene glycol, 566.0 g of allyl alcohol and 0.1 g of dibutyltin oxide, and they were heated up to 150° C. under a nitrogen gas stream and the resulting methanol was distilled off. When the amount of distilled methanol had reached a theoretical quantity (156.0 g), reaction temperature was raised up to 180° C. in order to distill off allyl alcohol. When the amount of distilled allyl alcohol had reached about 400 g, the pressure in the reaction system was reduced to 50 mmHg so as to accelerate the distillation rate of allyl alcohol. After excessive allyl alcohol had been distilled off, reaction was further performed for 1 hour, and the resulting reaction product was then cooled. After the reaction product had been solidified, and the solid of a prepolymer was ground into small masses. The latter were then put into 1 liter of methanol, and the mixture was stirred vigorously for about 1 hour, while the masses of the prepolymer were ground, whereby the powdery prepolymer was obtained. The used methanol was separated from the prepolymer by filtration, and afterward drying and grinding were carried out in order to prepare 482 g of the prepolymer.

EXAMPLE 14

Following the same procedure as in Example 13, a prepolymer was synthesized, and a reaction mixture containing the prepolymer was maintained at 200° C. and a monomer was distilled off under a pressure of 1 mmHg by the use of a thin film evaporator. Afterward, the reaction mixture was poured on a bat and then cooled to bring it into a thin film plate. This plate-like product was placed in a ball mill, and the latter was then rotated for 30 minutes, thereby obtaining 412 g of fine prepolymer powdery.

EXAMPLE 15

In a 10-liter autoclave equipped with a distillation device were placed 3 kg of DAT, 392 g of ethylene glycol and 0.5 g of dibutyltin oxide, and they were heated up to 180° C. under a nitrogen gas stream and the resulting allyl alcohol was distilled off. When the amount of distilled allyl alcohol had reached about 700 g, the pressure in the reaction system was reduced to 50 mmHg so as to accelerate the distillation rate of allyl alcohol. After the amount of distilled allyl alcohol had reached a theoretical amount, reaction was further performed for 1 hour. Afterward, the temperature of the reaction mixture was raised up to 200° C., and the reaction mixture was then sprayed, over 10 minutes, through a liquid transfer pipe disposed through the bottom of the autoclave into 6 kg of methanol which was being maintained at 10° C. and stirred vigorously, while the temperature of the reaction mixture was maintained during its transportation.

A solid suspending in the liquid was removed by filtration, and the liquid was then dried, thereby obtaining 2.36 kg of a powdery prepolymer.

EXAMPLE 16

(1) Preparation of Un-filled Compound

The DAT prepolymers obtained in Examples 1, 2 and 9 were separately sampled in an amount of 200 g, and 4.0 g of dicumyl peroxide was added thereto. They were mixed sufficiently in a mortar and then kneaded by rolls. This kneading was carried out for 5 minutes by the front rolls having a temperature of 100° to 110° C. and the back rolls having a temperature of 70° to 90° C. The kneaded material was taken out in a film state through the rolls, and the film was then allowed to stand. Afterward, it was ground and then used.

(2) Compression Molding of Un-filled Compound

A predetermined amount of the above obtained unfilled compound was sampled and then placed in a mold for compression molding ($100\times100\times3$ mm or $15\times15\times90$ mm) the temperature of which was maintained at 80° C. A pressing load of about 100 kg/cm$^2$ was then applied, and the temperature of the mold was raised up to 120° C. over 30 minutes. Afterward, this temperature was maintained for 10 minutes. The molded article was taken out from the mold and then immediately placed in an oven at 150° C., and it was allowed to stand for 10 hours. Afterward, physical properties of the molded article were measured, and the results are set forth in Table 2.

TABLE 1

|  | Ex. 1 | Ex. 2 | Ex. 3 | Ex. 4 | Ex. 5 | Ex. 6 |
|---|---|---|---|---|---|---|
| DAT | 600 g | 600 g | 600 g | 600 g | 600 g | 600 g |
| Diol | ethylene glycol | 1, 4-butanediol | 1, 4-cyclohexane dimethanol | 1, 2-propylene glycol | 1, 3-butanediol | ethylene glycol |
|  | 78.4 g | 109.8 g | 175.7 g | 92.7 g | 109.8 g | 104.5 g |
| Polyol | none | none | none | none | none | none |
| Catalyst | n-Bu$_2$SnO | n-Bu$_2$SnO | n-Bu$_2$SnO | n-Bu$_2$SnO | n-Bu$_2$SnO | n-Bu$_2$SnO |
|  | 0.1 g | 0.1 g | 0.1 g | 0.1 g | 0.1 g | 0.1 g |
| Yield | 496 g | 534 g | 608 g | 513 g | 491 g | 466 g |
| Iodine Value | 81.7 | 62.4 | 57.4 | 89.4 | 89.8 | 57.5 |
| GPC Method Mn | $9.42 \times 10^3$ | $1.25 \times 10^3$ | $1.94 \times 10^3$ | $1.16 \times 10^3$ | $1.26 \times 10^3$ | $1.01 \times 10^3$ |
| GPC Method Mw | $2.52 \times 10^4$ | $2.36 \times 10^3$ | $1.43 \times 10^4$ | $5.07 \times 10^3$ | $7.81 \times 10^3$ | $3.62 \times 10^3$ |
| Mw/Mn | 2.68 | 1.87 | 7.41 | 4.39 | 6.19 | 3.60 |
| Softening Range | 107–117° C. | 107–124° C. | 258–290° C. | liquid at ordinary temp. | liquid at ordinary temp. | 213–225 |

|  | Ex. 7 | Ex. 8 | Ex. 9 | Ex. 10 | Ex. 11 | Ex. 12 |
|---|---|---|---|---|---|---|
| DAT | 600 g | 600 g | 600 g | 600 g | 600 g | 600 g |
| Diol | ethylene glycol | 1, 2-propylene glycol | ethylene glycol | ethylene glycol | 1, 2-propylene glycol | 1, 2-propylene glycol |
|  | 117.6 g | 123.6 g | 78.4 g | 78.4 g | 92.7 g | 92.7 g |
| Polyol | none | none | penta-E 40.0 g | tri-M 48.8 g | penta-E 40.0 g | tri-M 48.8 g |
| Catalyst | n-Bu$_2$SnO | n-Bu$_2$SnO | n-Bu$_2$SnO | n-Bu$_2$SnO | n-Bu$_2$SnO | n-Bu$_2$SnO |
|  | 0.1 g | 0.1 g | 0.1 g | 0.1 g | 0.1 g | 0.1 g |
| Yield | 481 g | 473 g | 502 g | 531 g | 512 g | 493 g |
| Iodine Value | 45.4 | 76.8 | 52.4 | 56.3 | 62.3 | 66.8 |
| GPC Method Mn | $1.17 \times 10^3$ | $1.30 \times 10^3$ | $2.29 \times 10^3$ | $2.12 \times 10^3$ | $3.23 \times 10^3$ | $3.08 \times 10^3$ |
| GPC Method Mw | $7.39 \times 10^3$ | $3.20 \times 10^3$ | $3.18 \times 10^4$ | $4.31 \times 10^4$ | $5.23 \times 10^4$ | $4.86 \times 10^4$ |

TABLE 1-continued

| Mw/Mn | 6.34 | 2.46 | 13.9 | 20.3 | 16.2 | 15.8 |
|---|---|---|---|---|---|---|
| Softening Range | 223–231° C. | liquid at ordinary temp. | 113–126° C. | 121–133° C. | liquid at ordinary temp. | liquid at ordinary temp. |

In the above, penta-E means pentaerythritol, and tri-M means trimethylolpropane.

TABLE 2

| Prepolymer | Bending Strength | Flexural Modulus |
|---|---|---|
| Example 1 | 10.6 kgf/mm$^2$ | 219 kgf/mm$^2$ |
| Example 2 | 9.6 kgf/mm$^2$ | 226 kgf/mm$^2$ |
| Example 3 | 10.0 kgf/mm$^2$ | 231 kgf/mm$^2$ |

TABLE 3

|  | Ex. 13 | Ex. 14 | Ex. 15 | Ex. 16 | Ex. 17 |
|---|---|---|---|---|---|
| DAT | 900 g | 1400 g | 600 g | 1341 g | 600 g |
| Diol | ethylene glycol 78.4 g | 1, 2-propylene glycol 289 g | neopentyl glycol 170 g | 1, 2-propylene glycol 353 g | 1, 2-propylene glycol 46.6 g |
| Diol | 1, 2-propylen glycol 92.7 g | none | none | none | neopentyl glycol 127 g |
| Polyol | none | pentaerythritol 85.0 g | none | none | none |
| Catalyst | n-Bu$_2$SnO 0.15 g | n-Bu$_2$SnO 0.70 g | n-Bu$_2$SnO 0.30 g | n-Bu$_2$SnO 1.2 g | n-Bu$_2$SnO 0.6 g |
| Yield | 769 g | 1132 g | 532 g | 783 g | 512 g |
| Iodine Value | 50.4 | 84.1 | 82.7 | 42.3 | 61.8 |
| GPC Method Mn | $1.51 \times 10^3$ | $4.23 \times 10^3$ | $2.05 \times 10^3$ | $4.23 \times 10^3$ | $1.58 \times 10^3$ |
| GPC Method Mw | $4.26 \times 10^3$ | $2.12 \times 10^4$ | $1.14 \times 10^4$ | $1.89 \times 10^4$ | $3.16 \times 10^3$ |
| Mw/Mn | 2.82 | 5.01 | 5.58 | 4.47 | 2.00 |
| Softening Range | 104–135° C. | 54–68° C. | 95–109° C. | 48–89° C. | 52–85 |

What is claimed is:

1. A diallyl terephthalate prepolymer essentially having the following structure $$CH_2=CHCH_2O(COArCOOBO)_nCOAr-COOCH_2CH=CH_2$$

wherein B is a divalent organic residue derived from a diol having 2 to 20 carbon atoms, Ar is a 1,4-phenylene group, and n is a value of 1 to 100, and having an unsaturation in a range of 20 to 100, as represented by an iodine value determined by the Wijs method.

2. A diallyl terephthalate prepolymer having an allyl ester group at its terminal, having the following repeating units —(COArCOOBO)—  moiety A —(COArCOO)$_x$—Z—O—COArCOO—  moiety B wherein x is a value of 2 to 10, Z is an organic residue derived from a polyol having 3 to 10 hydroxyl groups, B is a divalent organic residue derived from a diol having 2 to 20 carbon atoms, and Ar is a 1,4,-phenylene group, and having an unsaturation in a range of 20 to 100, as represented by an iodine value determined by the Wijs method, the mol fraction of the moiety A in the prepolymer portion exclusive of the terminal allyl groups being in a range of 10 to 98%, and the mol fraction of the moiety B being in a range of the remaining mol%.

3. A diallyl terephthalate prepolymer according to claim 1 or 2 wherein the number average molecular weight (Mn) is from 500 to 15,000 as polystyrene and the weight average molecular weight (Mw) is from 1,000 to 70,000 as polystyrene, and the Mw/Mn ratio is from 1.20 to 20.0, said Mn and Mw being determined by gel permeation chromatography.

4. A diallyl terephthalate prepolymer according to claim 3 wherein each of Z and B is a saturated aliphatic hydrocarbon having 2 to 10 carbon atoms.

5. A method for preparing a diallyl terephthalate prepolymer essentially having the following structure $$CH_2=CHCH_2O(COArCOOBO)_nCOAr-COOCH_2CH=CH_2$$

wherein B is a divalent organic residue derived from a diol having 2 to 20 carbon atoms, Ar is a 1,4-phenylene group, and n is a value of 1 to 100, and having an unsaturation in a range of 20 to 100, as represented by the iodine value determined by the Wijs method, or a diallyl terephthalate prepolymer having an allyl ester group at its terminal, having the following repeating units —(COArCOOBO)—  moiety A —(COArCOO)$_x$—Z—O—COArCOO—  moiety B wherein X is a value of 2 to 10, Z is an organic residue derived from a polyol having 3 to 10 hydroxy groups, B is a divalent organic residue derived from a diol having 2 to 20 carbon atoms, and Ar is a 1,4-phenylene group, and having an unsaturation in a range of 20 to 100, as represented by the iodine value determined by the Wijs method, the mol fraction of the moiety A in the prepolymer portion exclusive of the terminal allyl groups being in a range of 10 to 98%, and the mol fraction of the moiety B being in a range of the remaining mol%,
 said method comprising reacting dimethyl terephthalate or diethyl terephthalate, one or more of divalent or higher-valent saturated aliphatic polyols and allyl alcohol in the presence of an ester exchange catalyst, while distilling off methanol or ethanol.

6. A method for preparing a diallyl terephthalate prepolymer essentially having the following structure $$CH_2=CHCH_2O(COArCOOBO)_nCOAR\text{-}COOCH_2CH=CH_2$$

wherein B is a divalent organic residue derived from a diol having 2 to 20 carbon atoms, Ar is a 1,4-phenylene group, and n is a value of 1 to 100, and having an unsaturation in a range of 20 to 100, as represented by the iodine value determined by the Wijs method, or a diallyl terephthalate prepolymer having an allyl ester group at its terminal, having the following repeating units —(COArCOOBO)—  moiety A —(COArCOO)$_x$—Z—O—COArCOO—  moiety B wherein X is a value of 2 to 10, Z is an organic residue derived from a polyol having 3 to 10 hydroxy groups, B is a divalent organic residue derived from a diol having 2 to 20 carbon atoms, and Ar is a 1,4-phenylene group, and having an unsaturation in a range of 20 to 100, as represented by the iodine value determined by the Wijs method, the mol fraction of the moiety A in the prepolymer portion exclusive of the terminal allyl groups being in the range of 10 to 98%, and the mol fraction of the moiety B being in a range of the remaining mol%, said method comprising reacting diallyl terephthalate and one or more of divalent or higher-valent saturated aliphatic polyols in the presence of an ester exchange catalyst, while distilling off allyl alcohol.

7. A method for preparing a diallyl terephthalate prepolymer according to claim 5 or 6 wherein after the reacting, the method comprises isolating the prepolymer by distilling off diallyl terephthalate from the resulting reaction mixture under reduced pressure of 10 mmHg or less, followed by grinding the prepolymer into a powder by means of a grinder.

8. A method for preparing a diallyl terephthalate prepolymer according to claim 5 or 6 wherein after the reaction, the method comprises isolating the prepolymer by pouring the resulting reaction mixture into a solvent which is a poor solvent for the diallyl terephthalate prepolymer, and then powdering the reaction mixture.

* * * * *